(12) United States Patent
Peng

(10) Patent No.: US 6,305,676 B1
(45) Date of Patent: Oct. 23, 2001

(54) BUCKLING DEVICE OF A SCANNER HEAD

(75) Inventor: Sheng Yeh Peng, Taipei Hsien (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/448,581

(22) Filed: Nov. 24, 1999

(51) Int. Cl.$^7$ ........................................................ F16F 1/18
(52) U.S. Cl. .......................... 267/160; 292/209; 361/726; 359/198
(58) Field of Search .................................. 267/160, 159, 267/182; 292/209, 214, 218; 361/724, 725, 726, 727, 740, 747, 759; 359/197, 198

(56) References Cited

U.S. PATENT DOCUMENTS

| | | | |
|---|---|---|---|
| 5,264,956 | * 11/1993 | Tzu-Chin | 359/196 |
| 5,769,515 | * 6/1998 | Chang | 312/223.2 |
| 6,026,261 | * 2/2000 | Peng | 399/211 |

FOREIGN PATENT DOCUMENTS

29915040 * 11/1999 (DE) .

* cited by examiner

*Primary Examiner*—Pam Rodriguez
(74) *Attorney, Agent, or Firm*—Rosenberg, Klein & Lee

(57) ABSTRACT

A buckling device of a scanning head is installed at an initial position of an optic module of the scanner. A slot is formed on the casing of a scanner for being positioned and inserted by a swingable piece. Two lateral surfaces of the swingable piece are pivotally installed to a pair of shaft grooves on the casing by respective projecting shafts. The swingable piece has an upper stopper for being inserted into an engaging hole of the optic module. The swingable piece is installed with a lower stopper and a sliding groove is installed on the casing. A gate is installed in the sliding groove. A hooking piece protrudes from one end of the sliding groove for hooking one end of the spring at one side of the gate; another end of the spring is connected to a hook portion at an end surface of the sliding rod passing through another end of the gate. A transverse piece and a straight piece are installed on the sliding rod. The straight piece is buckled to a resisting surface at a bottom of the optic module. As the optic module returns to the initial position, the straight piece drives the sliding rod to move towards another side without hindering the lower stopper by the transverse piece so that the lower stopper forms a buckling effect.

3 Claims, 9 Drawing Sheets

BUCKLING DEVICE OF A SCANNER HEAD

FIELD OF THE INVENTION

The present invention relates to a buckling device of a scanning head, and especially to a fixing structure, wherein as a scanning head returns to its initial position, a swingable piece will cause a buckling effect.

BACKGROUND OF THE INVENTION

In the prior art, the buckling device of a scanning head serves to prevent any damage from the movement of a scanner during transport. Therefore, a safety lock is installed on the scanner for locking the scanning head to prevent shift. After transport, the lock must be released for normal operation. However, after the manufacturer assembles a finished product, it is locked for packaging. The user often does not know to unlock the lock, so that the scanner cannot be operated. This often causes a user to conclude that the scanner is defective and requests maintenance service by phone or returns the scanner. Moreover, after starting up the scanner, the motor may be left operating continuously such that it is destroyed. Therefore, the prior art buckling structure of a scanner with a safety lock is not suitable in practice, and an improved design is much needed.

SUMMARY OF THE INVENTION

Accordingly, the primary object of the present invention is to provide a buckling device of a scanning head. In accordance with the present invention, an elastic means serves to restore an optic module back to its original position. A carrying means serves to generate a buckling effect as the scanner leaves a contact surface. Conversely, as the scanner contacts a contact surface, the buckling of components is released automatically. Therefore, use of the scanner may occur conveniently without the need to open or close the scanner.

Therefore, the present invention provides a buckling device of a scanning head installed at an initial position of an optic module of the scanner. A slot is formed on the casing of a scanner for positioning and engagement by a swingable piece. Two lateral surfaces of the swingable piece are pivotally coupled to a pair of shaft grooves on the casing by respective projecting shafts. The swingable piece has an upper stopper for being inserted into an engagement hole of the optic module. The swingable piece is installed with a lower stopper and a sliding groove is installed on the casing. A gate is installed in the sliding groove. A hooking piece protrudes from one end of the sliding groove for hooking one end of a spring at one side of the gate; another end of the spring is connected to a hook portion at an end surface of the sliding rod passing through another side of the gate. A straight piece is buckled to a resisting surface at a bottom of the optic module. As the optic module returns to the initial position, the straight piece drives the sliding rod to move towards another side without hindering the lower stopper by a transverse piece so that the lower stopper is free to form a buckling effect.

The various objects and advantages of the present invention will be more readily understood from the following detailed description when read in conjunction with the appended drawings.

DETAILED DESCRIPTION OF THE PREFERRED EMBODIMENTS

Figure 1:
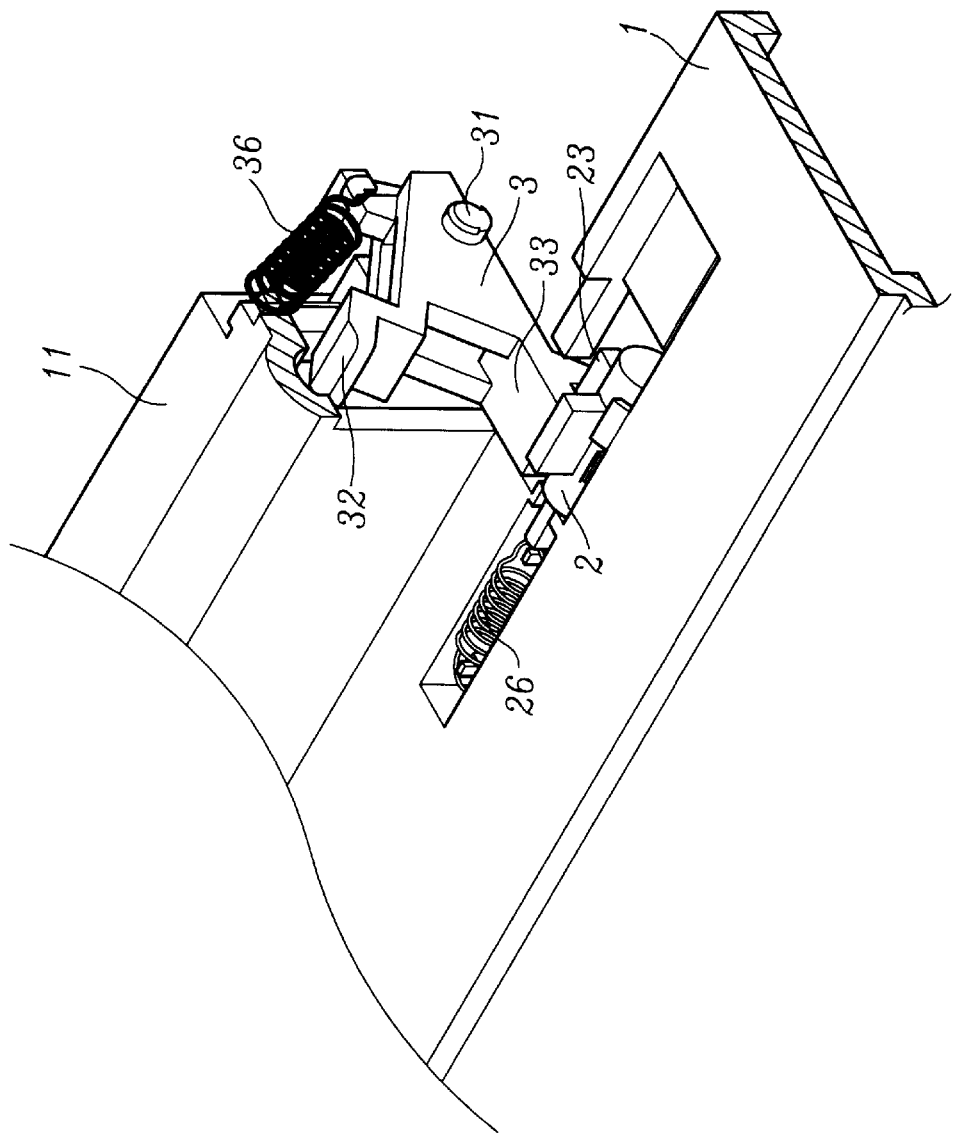
FIG. 1 is a perspective view of the present invention.

With reference to FIGS. 1 to 9, the buckling device of a scanning head of the present invention is illustrated, which is installed at the starting position of an optic module 5 of a scanner. Only the primary structure of the related portions are illustrated in the Figure. A slot 12 is installed on the protrusion 11 of the casing 1 for positioning and engagement by a swingable piece. As shown in the figure, the swingable piece 3 is a triangular body. Each of the front and rear sides of the body has a respective projecting shaft 31 pivotally connected to a shaft groove 13 at the casing of the slot 12.

Figure 2:
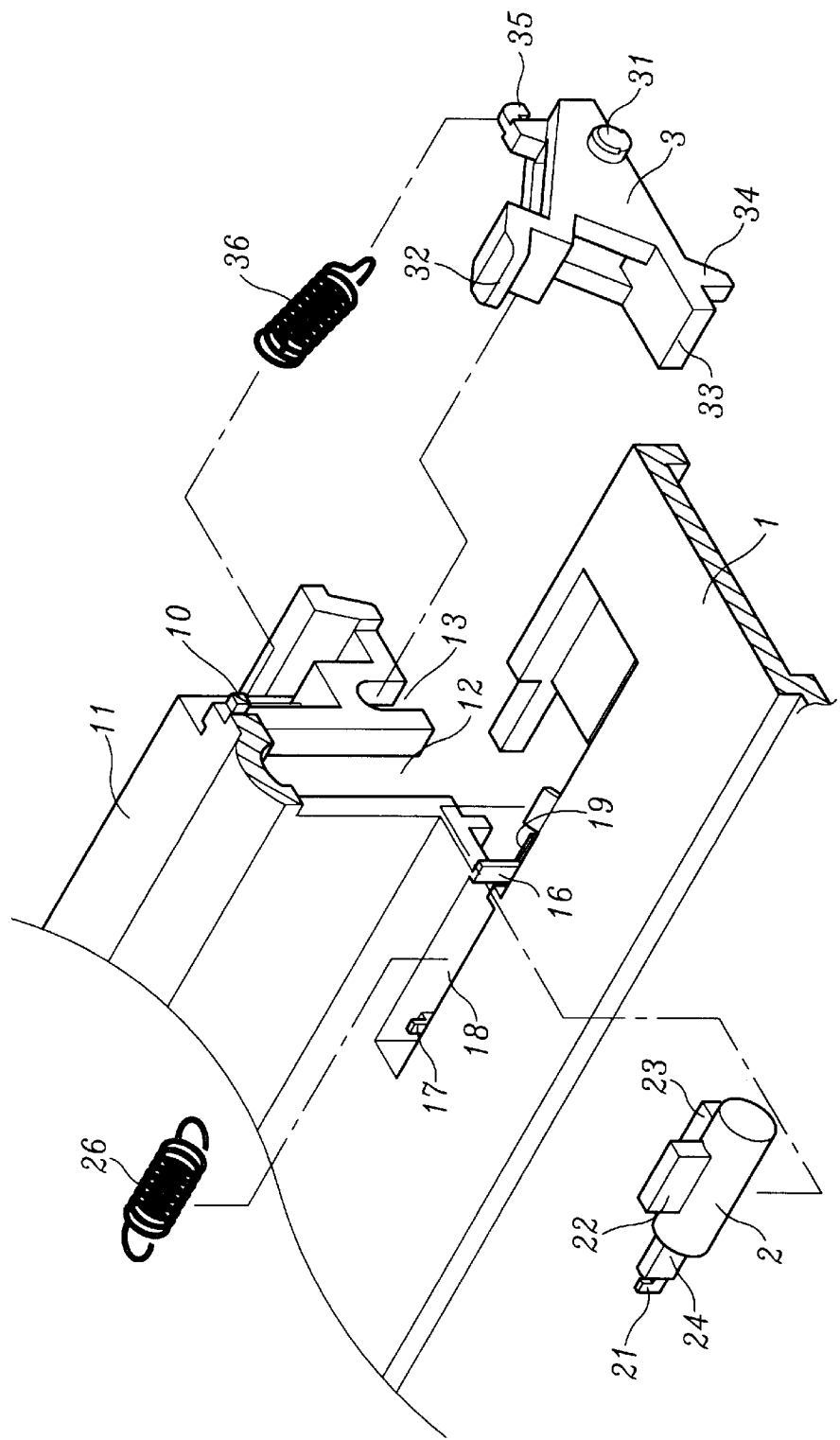
FIG. 2 is an exploded perspective view of the present invention.
Figure 3:
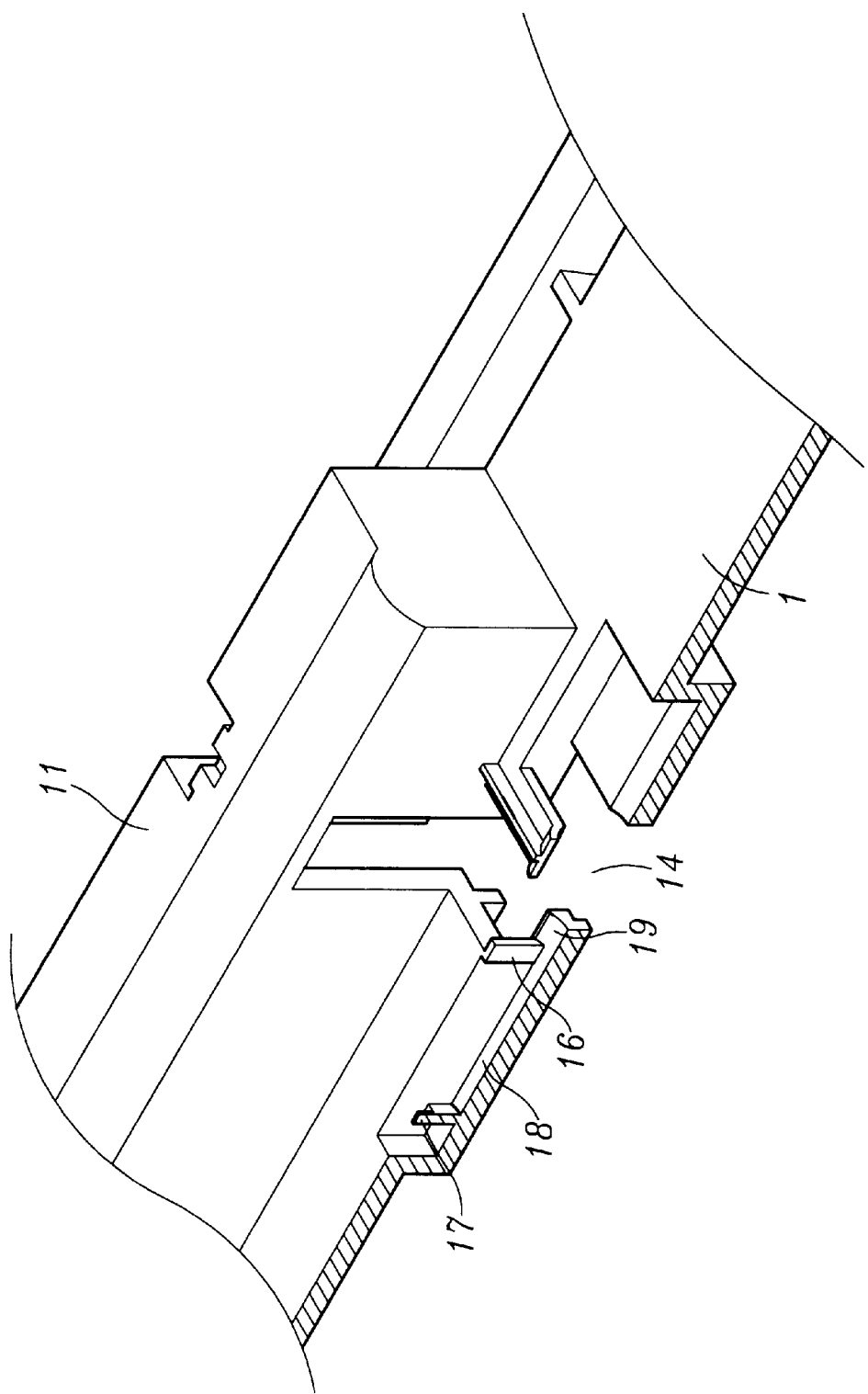
FIG. 3 is a cross-sectional perspective view showing partially the casing of the present invention.
Figure 4:
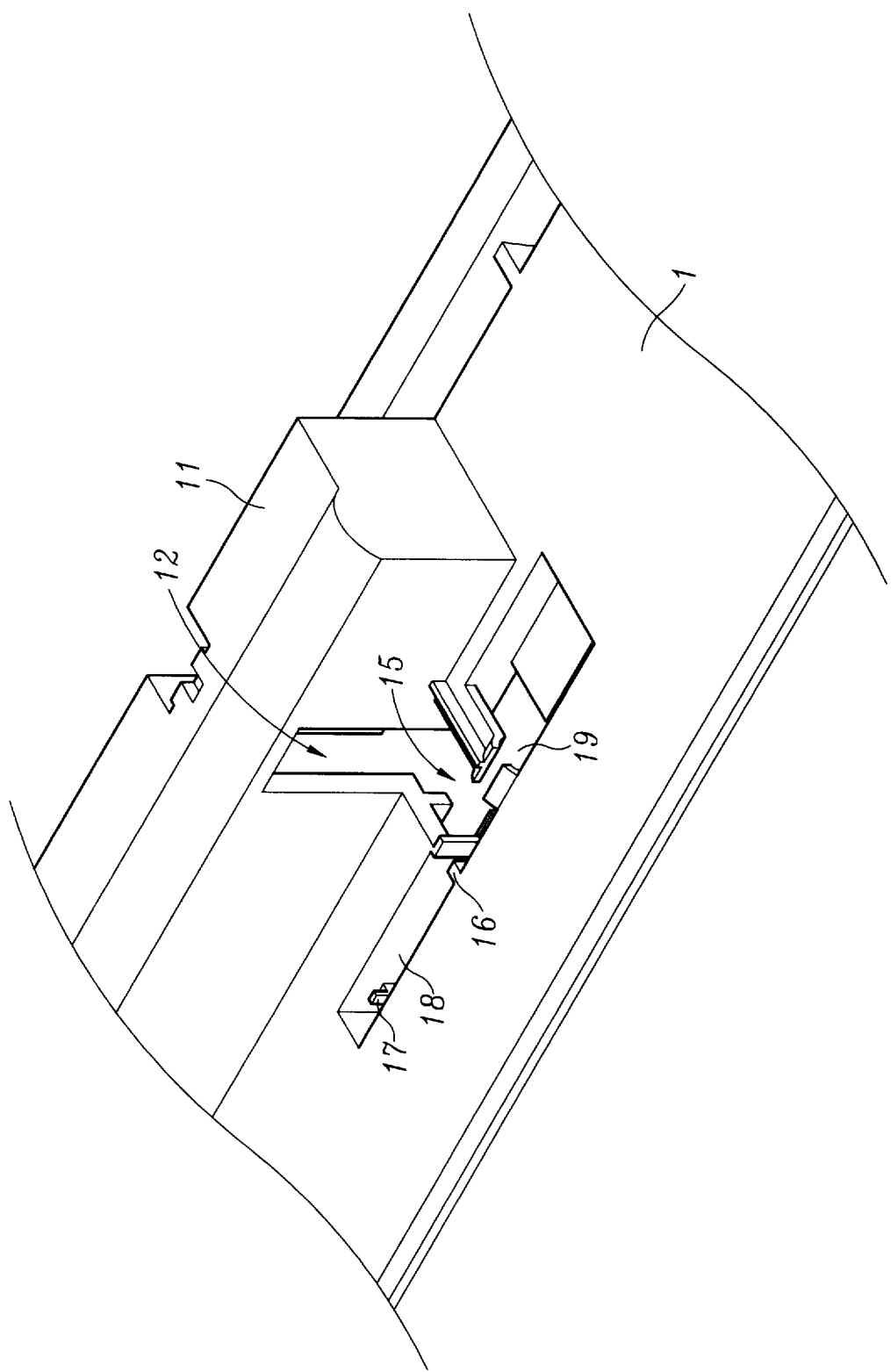
FIG. 4 is a perspective view showing part of the casing of the present invention.
Figure 5:
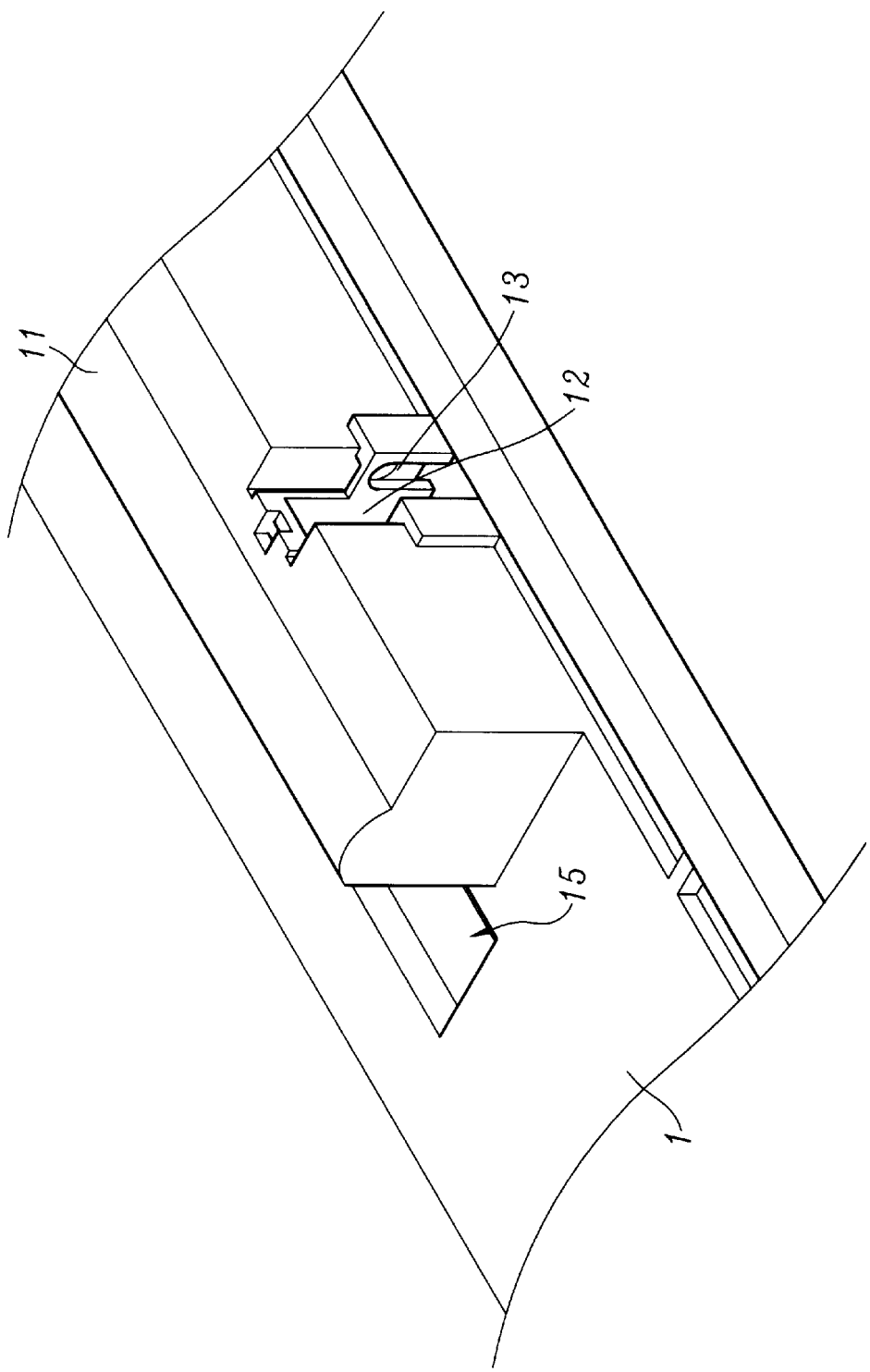
FIG. 5 shows another lateral perspective view about part of the casing according to the present invention.
Figure 6:
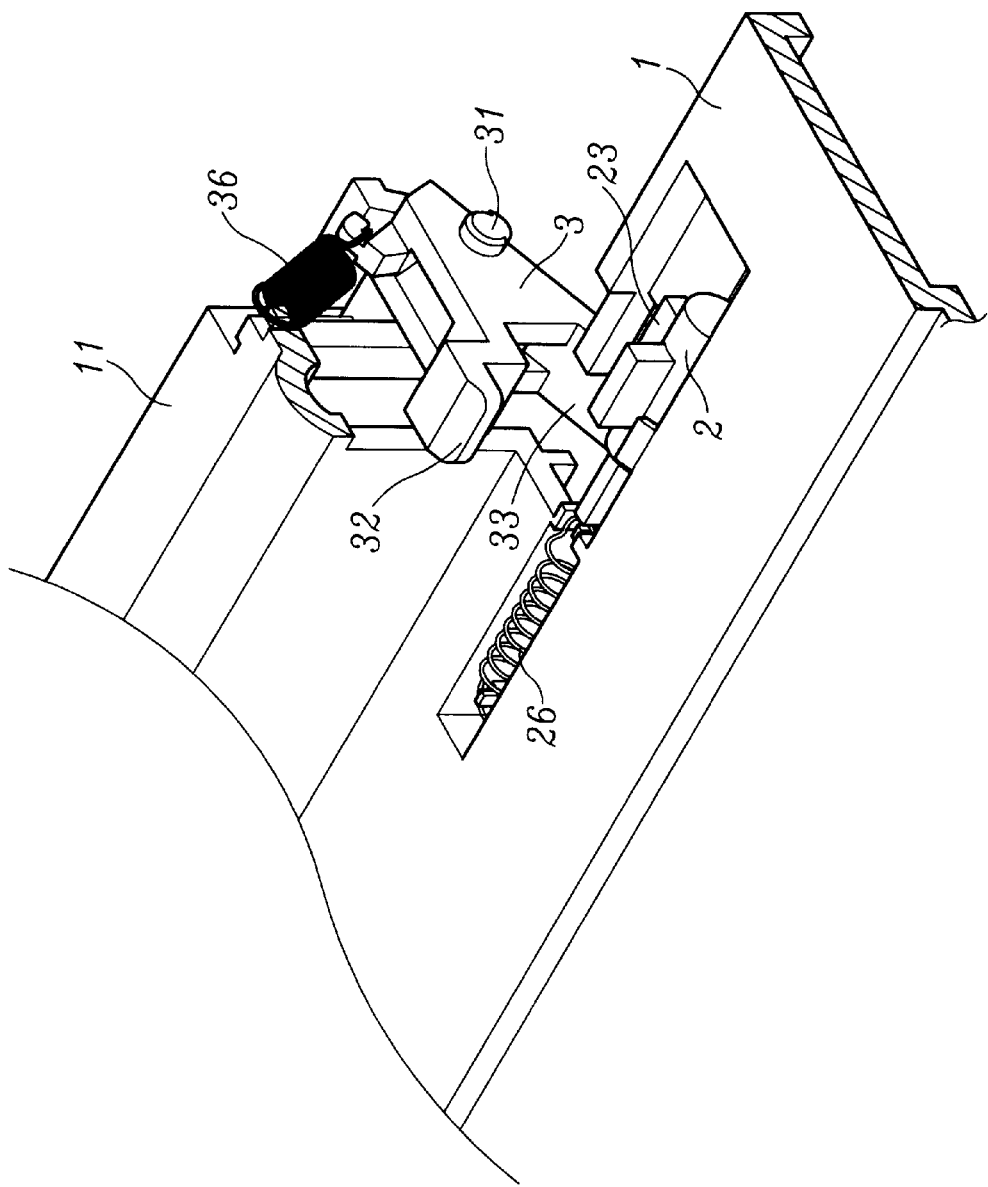
FIG. 6 is a perspective view showing the present invention in its unbuckled state.
Figure 7:
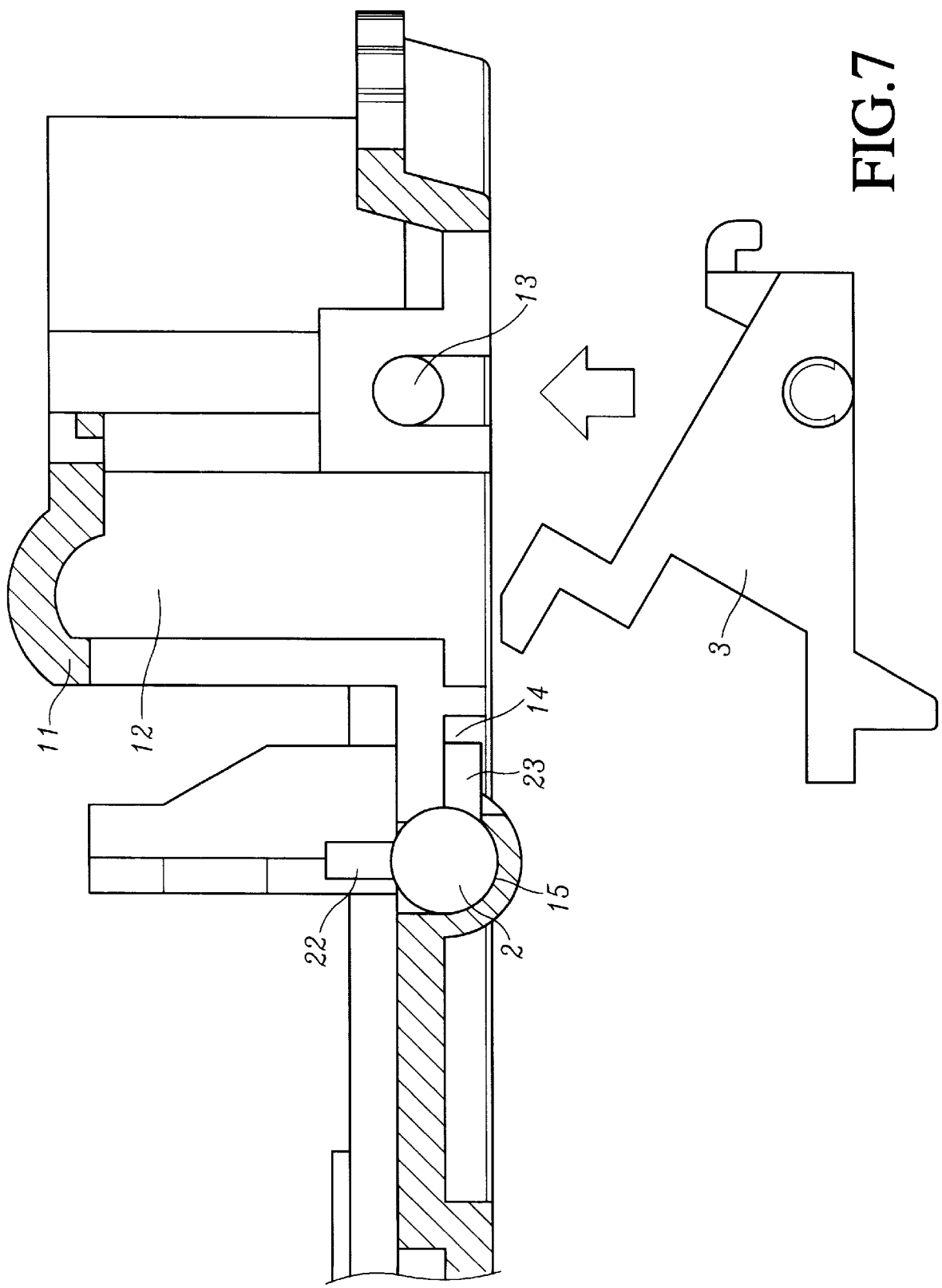
FIG. 7 is a lateral schematic view of the present invention during assembly.

Referring to FIGS. 2 and 7, the swingable piece 3 inserts into the slot 12 from one opening of the casing 1, meanwhile the projecting shaft is positioned so as to cause the swingable piece 3 to rotate. FIGS. 3 to 5 show the arrangement of the slot 12. The lateral surface of the protrusion 11 is formed with a notch, and a lateral hook 10 is formed on the protrusion 11 for hooking the upper end of a spring 36. The lower end of the spring is hooked by the hook 35 at one side of the swingable piece 3. Normally, the spring is extended. That is, in buckling, the spring is released from a compressing condition, and the spring 36 will push the swingable piece 3 to rotate. Then, the condition is changed to that in FIG. 6 from that in FIG. 1.

Figure 8:
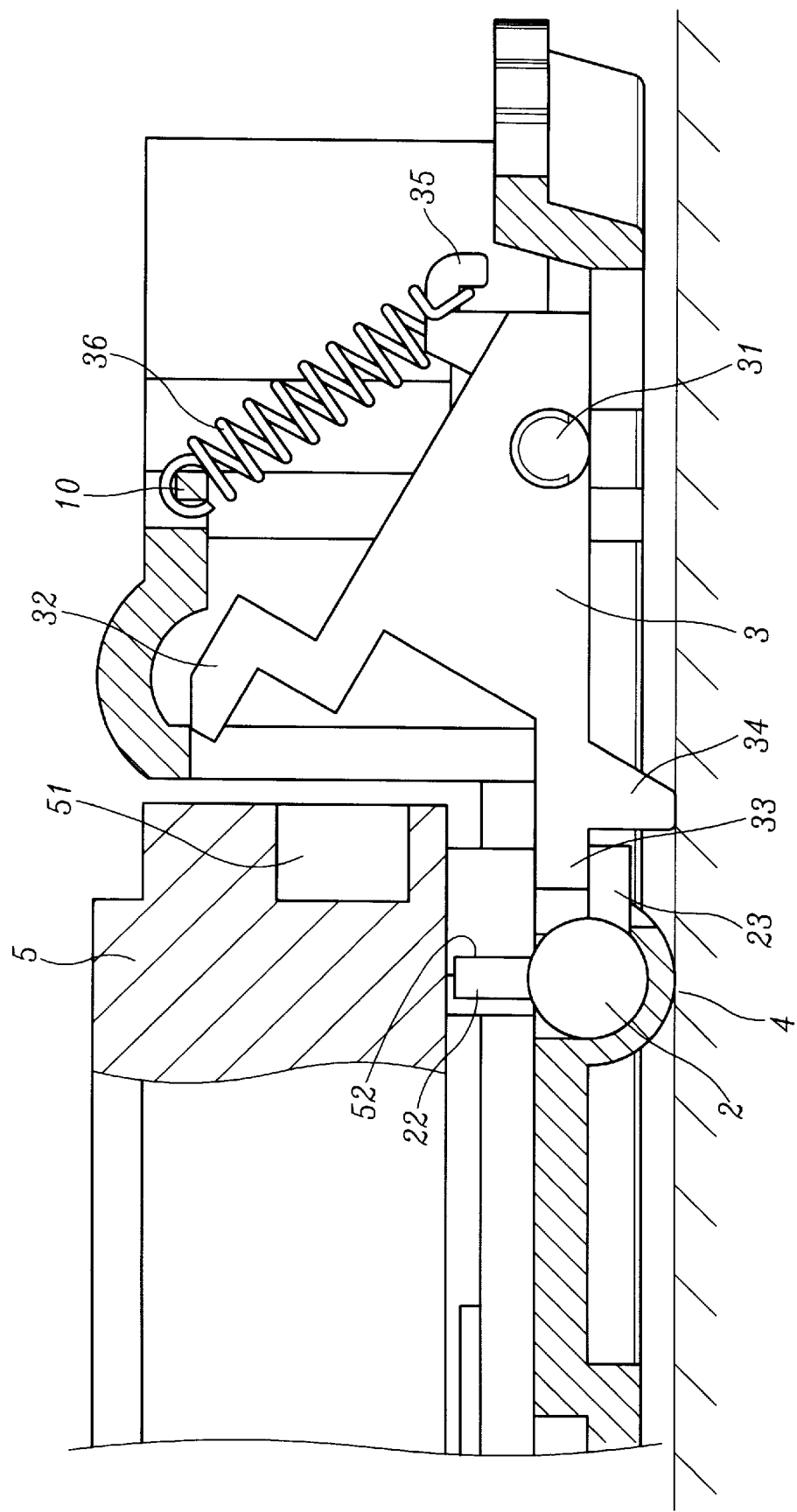
FIG. 8 is a lateral schematic cross-sectional view of the present invention which is assembled but in its unbuckled state.
Figure 9:
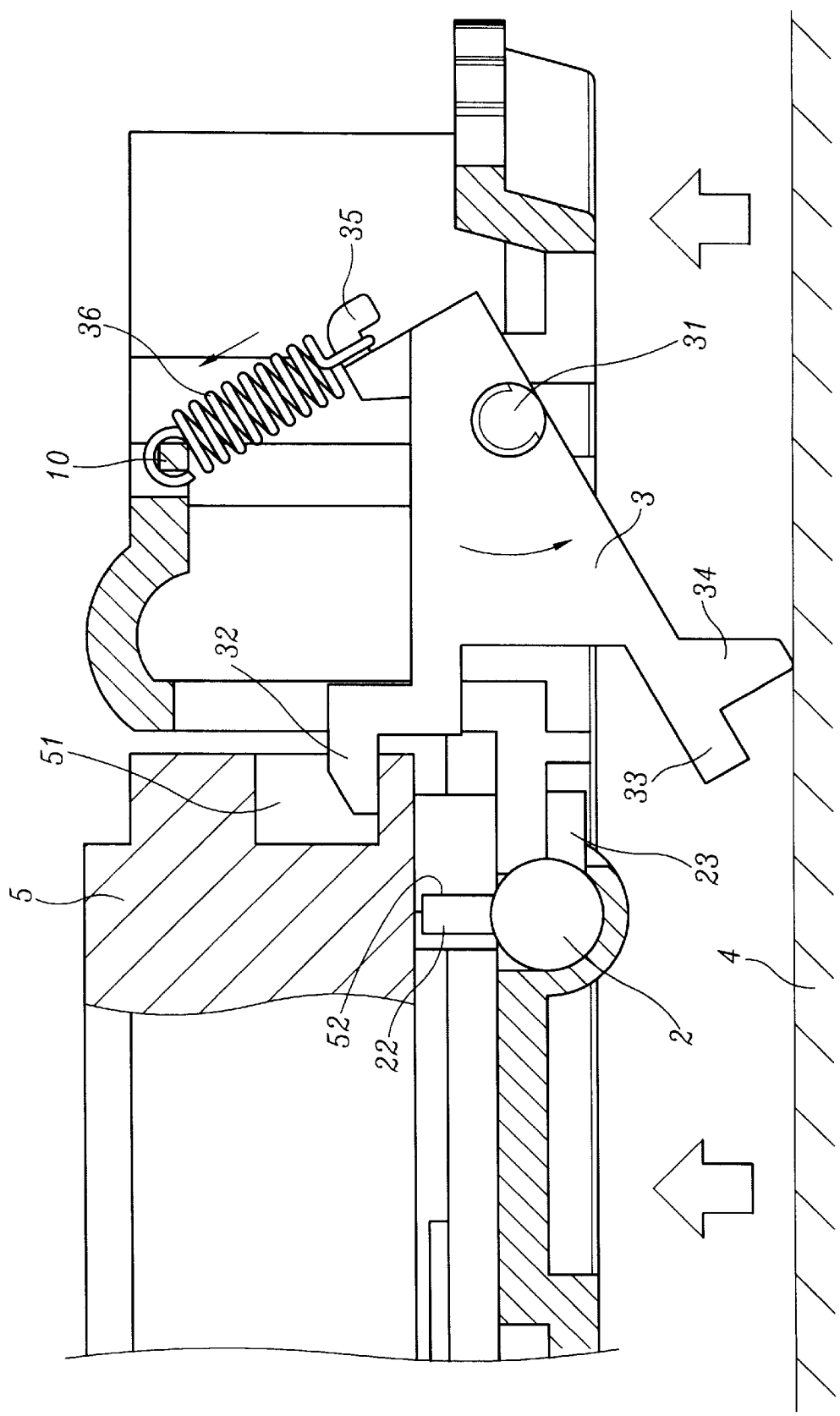
FIG. 9 is a lateral schematic cross-sectional view of the present invention which is assembled and in its buckled state.

The swingable piece 3 has an upper stopper 32 for inserting into the engaging hole 51 of the optic module 5, as shown in FIG. 8. The swingable piece 3 has a lower stopper 33. A sliding groove 15 is installed on the casing 1. The sliding groove 15 is parallel to the protrusion 11. The sliding groove 15 has a gate 16. One end of the sliding groove 15 has protruding therefrom a hooking piece 17 for hooking a spring 26 at one side (left side) 18 of the gate 16. Another end of the spring 26 is connected to a hook 21 formed at a sliding rod 2 passing through another side (right side) 19 of the gate 16. A rectangular rod 24 is disposed on the sliding rod 2. The rectangular rod 24 may slide on the gate 16. Another end of the rectangular rod 24 is formed with a round rod on which a transverse piece 23 and a straight piece 22 are installed. The straight piece 22 is buckled to a long groove 52 at the bottom of the optic module 5. As the optic module 5 moves back to the original position, the straight piece 22 serves to drive the sliding rod 2 to slide (shown in the right side of FIG. 1). Now, the lower stopper 33 will not be stopped in the space 14 of the transverse piece 23. Since the transverse piece 23 does not stop the lower stopper 33 of the swingable piece 3, the swingable piece 3 may attain any desired position easily so as to buckle the upper stopper.

In the aforesaid structure, FIGS. 1 and 8 show one state of the present invention, wherein the optic module 5 has not been buckled, since the casing 1 is resting upon a supporting surface 4. Then, a nose portion 34 at the bottom of the swingable piece 3 will remain retracted to a flat orientation and fix the swingable piece 3. Thereby, the lower stopper 33 of the swingable piece 3 is overlapped with the transverse piece 23 of the sliding rod 2 at the right side of the sliding groove 15 so as to cause the upper stopper 32 to swing upwards.

As the casing 1 is removed from the supporting surface 4, the spring 36 will lose a compressing force so that the swingable piece 3 will rotate. Thus, the optic module 5 will be positioned through the upper stopper 32. Now, it should be appreciated that as the optic module 5 moves back to its initial position, a resisting surface 52 serves to drive the straight piece 22 to move so as to drive the sliding rod 2 to move in the round sliding groove 15. Thus, the spring 26 is extended until it is buckled. Thereby, the lower stopper 33 of the swingable piece 3 and the transverse piece 23 of the sliding rod 2 are arranged in the front and rear positions of the right sides of the sliding groove 15 and are not overlapped. Therefore, the whole structure may operate in an automatic mode, whereby the scanning head returns to the initial position, and the motor stops. The buckling action occurs upon lifting the scanner upwards so as to prevent damage during operation. When the scanner body is lifted suddenly, scanning action is stopped immediately.

The present invention has the following advantages:

1. The lower end of the buckling means is pushed to rotate by a supporting surface, and thus the swingable piece will separate with the engaging hole. The scanning head may move immediately. User action is not necessary to release the structure. It is only necessary to put the scanner on the supporting surface for use.

2. In transport, while the scanner remains separated from the supporting surface, the scanning head returns back to the initial position. The buckling action is generated automatically, with the swingable piece engaging the engaging hole, such that the scanner may be packaged and carried conveniently. During transport, the scanning head will not shift.

3. In the automatic mode, the scanning head returns to the initial position, the motor stops, and the buckling action occurs in order to prevent damage when—during operation—the body is lifted suddenly. The scanning action is thus stopped immediately. Therefore, the whole performance of the scanner can be improved in order to avoid destruction from carelessness.

Although the present invention has been described with reference to the preferred embodiments, it will be understood that the invention is not limited to the details described thereof. Various substitutions and modifications have been suggested in the foregoing description, and others will occur to those of ordinary skill in the art.

Therefore, all such substitutions and modifications are intended to be embraced within the scope of the invention as defined in the appended claims.

What is claimed is:

1. A buckling device of a scanning head installed at an initial position of an optic module of a scanner, wherein a slot is formed on the casing of said scanner for being positioned and inserted by a swingable piece; two lateral surfaces of the swingable piece are pivotally installed to a pair of shaft grooves on the casing by respective projecting shafts; said swingable piece has an upper stopper for being inserted into an engaging hole of said optic module; said swingable piece is installed with a lower stopper and a sliding groove is installed on the casing; a gate, a spring, and a sliding rod are installed in said sliding groove; a hooking piece protrudes from one end of said sliding groove for hooking one end of said spring at one side of said gate; another end of said spring is connected to a hook portion at an end surface of said sliding rod passing through another end of the gate; a transverse piece and a straight piece are installed on said sliding rod; the straight piece is buckled to a resisting surface at a bottom of said optic module; as said optic module returns to the initial position, said straight piece drives said sliding rod to move without hindering said lower stopper by said transverse piece so that said lower stopper forms a buckling effect.

2. The buckling device of a scanning head as claimed in claim 1, wherein a spring is installed between said swingable piece and said casing.

3. The buckling device of a scanning head as claimed in claim 2, wherein a side hook is formed on a protrusion of said slot on said casing, and a hook portion is installed at an opposite side of said lower stopper of said swingable piece.

* * * * *